(12) United States Patent
Will

(10) Patent No.: US 6,556,426 B1
(45) Date of Patent: Apr. 29, 2003

(54) LOW-INDUCTANCE ELECTROLYTIC CAPACITOR

(75) Inventor: Norbert Will, Heidenheim (DE)

(73) Assignee: EPCOS Aktiengesellschaft, München (DE)

( * ) Notice: Subject to any disclaimer, the term of this patent is extended or adjusted under 35 U.S.C. 154(b) by 0 days.

(21) Appl. No.: 10/019,635

(22) PCT Filed: May 24, 2000

(86) PCT No.: PCT/DE00/01661

§ 371 (c)(1),
(2), (4) Date: Dec. 27, 2001

(87) PCT Pub. No.: WO01/01428

PCT Pub. Date: Jan. 4, 2001

(30) Foreign Application Priority Data

Jun. 28, 1999 (DE) .......................... 199 29 597

(51) Int. Cl.[7] .............................. H01K 5/03; H01G 9/10
(52) U.S. Cl. ........................................ 361/520; 361/518
(58) Field of Search .......................... 361/503, 508–520

(56) References Cited

U.S. PATENT DOCUMENTS

| | | | | |
|---|---|---|---|---|
| 1,920,799 A | * | 8/1933 | Lilienfeld | .................... 361/519 |
| 5,579,203 A | * | 11/1996 | Klaschka | .................... 361/519 |
| 5,798,906 A | * | 8/1998 | Ando et al. | .................. 361/520 |

FOREIGN PATENT DOCUMENTS

| | | | |
|---|---|---|---|
| DE | 297 18 066 | 3/1998 | |
| DE | 298 20 720 | 3/1999 | |
| JP | 05-144681 | * 6/1993 | ............ H01G/9/04 |

* cited by examiner

Primary Examiner—Anthony Dinkins
Assistant Examiner—Eric Thomas
(74) Attorney, Agent, or Firm—Schiff Hardin & Waite

(57) ABSTRACT

A low-inductance electrolytic capacitor has an additional current guidance being provided from the winding via the pot and an electrically conductive disk to the negative lead-through, so that the current is divided for reducing the self-inductance.

16 Claims, 2 Drawing Sheets

LOW-INDUCTANCE ELECTROLYTIC CAPACITOR

BACKGROUND OF THE INVENTION

The invention us directed to a low-inductance electrolytic capacitor having a pot accepting a winding and an insulating terminating disk into which a positive lead-through and a negative lead-through for the winding are introduced.

DE-U-298 20 720 discloses an electrolytic capacitor wherein a resin-bonde paper disk reinforced with a metal plate is employed instead of the known terminating disk composed of plastic in order to reduce the inductance.

Given rapid switching events, as known, the self-inductance of electrolytic capacitors effects a delay of their smoothing function for the voltages. Various efforts have already been made to reduce the self-inductance of electrolytic capacitors in order to keep this delay as low as possible (see, for example, DE 297 18 066 U1). Many of these efforts aim at reducing individual inductances that all contribute to the overall inductance of an electrolytic capacitor. Nonetheless, a low-inductance electrolytic capacitor has not yet been successfully created that is distinguished by such a low self-inductance that a delay of the smoothing function for voltages can be avoided given rapid switching events.

SUMMARY OF THE INVENTION

It is therefore an object of the present invention to specify a low-inductance electrolytic capacitor that is distinguished by an extremely low self-inductance, so that a delay of its smoothing function for voltages can be practically largely avoided.

This object is inventively achieved by an electrolytic capacitor having a pot accepting a winding and having an insulating disk into which a positive lead-through and a negative lead-through for the winding are introduced, the capacitor having an electrically conductive disk at least in the region between the pot edge and the negative lead-through and electrically separated from the positive lead-through, the conductive disk being electrically conductively connected to a flared flange on an edge of the pot and electrically contacting the negative lead-through at an end facing away from the winding.

The invention thus embarks upon a path that departs completely from the previous state of the art. Instead of having recourse to measures that aim at a reduction of the individual inductances, as has been hitherto standard, an additional current path for high-frequency currents is constructed given the new, low-induction electrolytic capacitor that is laid for the minus contact between the winding of the electrolytic capacitor via the pot floor to the negative lead-through. To this end, the electrically conductive disk is provided at least in the region between the pot edge, which, of course, is connected via the pot casing to the pot floor, and the negative lead-through, whereby this electrically conductive disk, of course, is arranged electrically separated from the positive lead-through. For example, a current path between the pot of the electrolytic capacitor and the negative lead-through is constructed without further ado with a standard screw-type terminal in an electrolytic capacitor.

The electrically conductive disk is preferably composed of metal and, for example, is secured and electrically contacted to the upper flared flange of the pot and the negative lead-through. A hole for the positive lead-through is provided in the disk, and additional holes that allow the electrolytic capacitor or, respectively, its terminating disk to be viewed can be potentially provided.

The disk applied in the new low-inductance electrolytic capacitor serves the sole purpose of opening up the additional current path for high-frequency currents for the negative contact between winding via the pot floor to the negative lead-through. The disk assumes no further functions such as, in particular, mechanical fastening tasks, etc. For this reason, the disk can be implemented in a simple way and, for example, can be composed of a metal lattice, a wire net or even of correspondingly conducted individual wires. The expression "disk" is thus to be understood very broadly and is intended to cover any "disk-shaped" arrangement that is in the position of producing the desired electrical connection.

In existing electrolytic capacitors with a solder star, the current is in fact conducted from the winding to the negative contact via the housing, i.e. the pot. In such an electrolytic capacitor, however, there is only this single electrical connection between the negative contact and the winding.

Differing therefrom, the new low-inductance electrolytic capacitor has both the usual, direct connection between upper side of the winding and negative contact or, respectively, negative lead-through as well as the additionally provided, "indirect" connection via the pot floor, pot and disk. Given the inventive low-inductance electrolytic capacitor, the current can thus "divide", which leads to a corresponding reduction of the self-inductance of the electrolytic capacitor.

A critical advantage of the new low-inductance electrolytic capacitor is to be seen that the disk provided therein, which forms a critical feature of the invention, can also be installed without further ado in existing electrolytic capacitors. In other words, the application of the invention in existing electrolytic capacitors requires no difficult retrofitting for reducing the self-inductance.

The self-inductance can be reduced by about one-third through one-fourth by the planar electrical connection between the housing and the negative lead-through. Measurements undertaken by the inventor have shown that the inductances of electrolytic capacitors without the disk, having values of 17.7 nH, 14.8 nH or, respectively, 10.8 nH, can be reduced to values of 12.7 nH, 12.0 nH or, respectively, 7.65 nH given employment of a disk corresponding to the invention.

These values are obtained given utilization of a smooth or, respectively, planar disk that proceeds parallel to the surface of the terminating disk that is already present. In such an arrangement, the positive lead-through and the negative lead-through project beyond the disk since, in a preferred way as already set forth, the conductive disk is placed onto the flared flange of the pot and secured thereto.

In order to also reduce the current density in the upper region of the negative lead-through which projects beyond the disk, it is possible to design the disk so that the disk is initially contacted in the upper region of the negative lead-through. In other words, the disk contacts the negative lead-through at its end facing away from the winding. The self-inductance of the electrolytic capacitor can be reduced further in this way. However, greater demands are then to be made of the contactings of the electrolytic capacitor since the disk is arced "up" and proceeds practically in the plane of the end of the negative lead-through.

By employing a disk designed in this way, self-inductances in electrolytic capacitors of 17.7 nH or, respectively, 14.8 nH for capacitors without the disk can be reduced to values of 11.3 nH or, respectively, 10.0 nH for capacitors with the disk.

In order to additionally reduce the partial inductance of the positive lead-through, the disk can also be shaped so that the disks drops perpendicularly down to the height of the flared flange next to the positive lead-through, so that the disk has two different levels and the current in the disk can flow to the positive lead-through in a bifilar fashion. Given such a design of the disk, in other words, this proceeds up to the positive lead-through to a distance therefrom on the level of the upper end of the negative lead-through and, in the region of the positive lead-through, then drops onto the level of the flared flange of the pot. This is then what is referred to as a ¾ disk.

It is likewise possible to make exactly half the area of the disk respectively available to the positive lead-through and the negative lead-through and to provide the vertical drop-off of the disk in the region between the negative lead-through and the positive lead-through. Although a inductance as low as that with the ¾ disk cannot be achieved with such a design of the disk, what is referred to as a ½ disk, the contacting is less problematical since each lead-through, i.e. the positive lead-through and the negative lead-through, respectively has exactly half the area of the disk available to it for contacting.

As was initially set forth, the disk itself is preferably composed of metal, for example, aluminum. However, it is also possible to insulate the disk except for its contacting locations, i.e. to apply insulating material onto the disk composed in and of itself of metal, for example by coating, gluing, lacquering or enameling.

It is potentially possible to provide points of contact between the terminating disk and the disk, so that, for example, the disk presses against the terminating disk, as a result whereof the terminating disk of the electrolytic capacitor can be mechanically stabilized to prevent arching. Such a design of the disk for stabilizing the terminating disk also makes it possible to utilize thin terminating disks such as, for example, rubber-coated resin bonded paper disks.

Whereas it was assumed up to now that the disk is provided above the terminating disk at that side of the terminating disk facing away from the winding, this need not necessarily be so. On the contrary, the disk can also be arranged in the inside of the electrolytic capacitor, i.e. under the terminating disk. Given such a design, however, the self-inductance of the electrolytic capacitor is not lowered as much because the current must flow completely through the negative lead-through that then projects considerably from the terminating disk. In order to avoid too great an insulating outlay, the disk, given a disk lying under the terminating disk, can be secured to only that half of the terminating disk where the negative lead-through is placed. The advantage of such an embodiment is to be seen that the production sequence—except of the application of the disk on the underside of the terminating disk—and the outward appearance of the electrolytic capacitor remain unchanged. What is ultimately present here is merely a terminating disk modified by the disk in the region of the negative lead-through.

Given the inventive low-inductance electrolytic capacitor, it is advantageous that a connection of the pot to the winding is produced by additional impressions such as a middle bead or notches. The high-frequency currents that flow via the disk can thus proceed from the winding to the pot with a lower inductive impedance. In other words, it is possible in this way to further reduce the overall inductance of the inventive low-inductance electrolytic capacitor.

It has already been pointed out above that the disk can also be composed of a lattice or wire net. Finally, however, it is also possible to designationally coat the terminating disk with metal, so that this lamination assumes the function of the conductive disk. Aluminum is a suitable metal for this lamination since it can be applied without further ado by coating across the edge of the terminating disk into the interior of the electrolytic capacitor. A contacting then ensues via the pressure contact between the under edge of the terminating disk or, respectively, the lamination of the disk to the pot.

The invention is explained in greater detail below on the basis of drawings.

DESCRIPTION OF THE PREFERRED EMBODIMENTS

Figure 1:
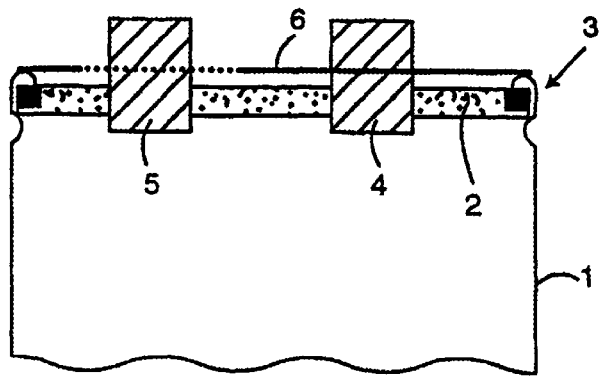
FIG. 1 is a schematic cross-sectional view of a first exemplary embodiment of the new low-inductance electrolytic capacitor with a smooth metal disk on the flared flange of the pot.

The same reference characters are respectively employed in the Figures for component parts that correspond to one another.

FIG. 1 shows an electrolytic capacitor with a pot 1 of metal that accepts a winding 9 (see FIG. 7) and with an insulating terminating disk 2 that is attached below a flared flange 3 of the pot 1. A negative lead-through 4 and a positive lead-through 5 are provided in this insulating terminating disk 2.

According to the invention, a metal conductive disk 6 is provided on the flared flange 3, and the metal disk 6 is electrically connected to the flared flange 3 and the negative lead-through 4. The disk 6 has a hole in the region of the positive lead-through 5, which is indicated with a broken or dotted line. In the present exemplary embodiment, this disk 6 is fashioned smooth and lies planarly on the flared flange 3, whereby it can, for example, be soldered to this flared flange 3.

As a result of the disk 6 that, for example, can be composed of aluminum, the current is conducted from the winding via the pot floor and the pot 1 to the negative lead-through 4, so that there is a current path in addition to the direct connection between an upperside of the winding and a negative pole. As has already been pointed out, a not inconsiderable reduction of the inductance is achieved by this division of the current. Given, for example, the electrolytic capacitor of the exemplary embodiment of FIG. 1, the inductance of 17.7 nH for a capacitor without the disk 6 can thus be reduced to 12.7 nH for a capacitor with the disk 6. Other values for capacitors with and without the disk have already been recited above.

Figure 2:
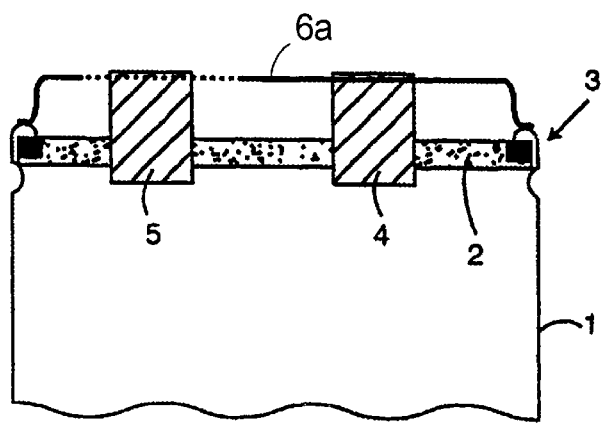
FIG. 2 is a schematic cross-sectional view of the new low-inductance electrolytic capacitor in a second exemplary embodiment with an elevated disk.

FIG. 2 shows a second exemplary embodiment of the invention wherein the conductive disk 6a is designed elevated, so that it proceeds in the upper region of the negative lead-through 4. The current density can thus be reduced in this upper region of the negative lead-through 4, which enables an even lower self-inductance of the electrolytic capacitor. As a result of this disk 6a, the self-inductance of the electrolytic capacitor can thus be reduced from 17.7 nH without the disk to 11.3 nH with the disk. Compared to the first exemplary embodiment of FIG. 1, thus, an additional reduction from 12.7 nH to 11.3 nH can be achieved.

Figure 3:
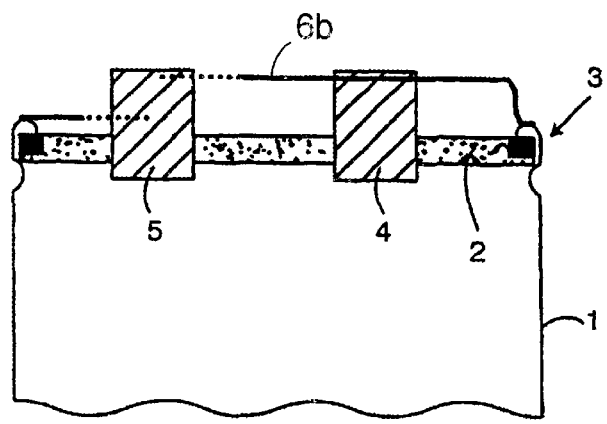
FIG. 3 is a schematic cross-sectional view of the new low-inductance electrolytic capacitor in a third exemplary embodiment with a "¾ disk"

FIG. 3 shows a third exemplary embodiment of the new low-inductance electrolytic capacitor wherein the conductive disk 6b is designed such that the disk 6b proceeds perpendicularly next to the positive lead-through 5. The current in the disk 6b can thus proceed to the positive lead-through 5 in a bifilar fashion. Given what is referred to as this "¾ disk", the partial inductance of the positive lead-through 5 is thus reduced in addition to the exemplary embodiment of FIG. 1.

Figure 4:
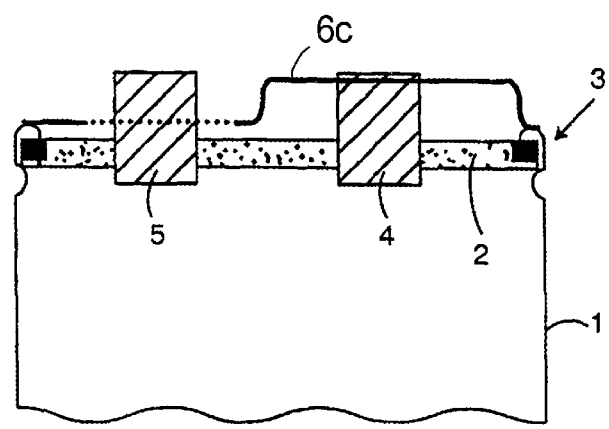
FIG. 4 is a schematic cross-sectional view of the new low-inductance electrolytic capacitor in a fourth exemplary embodiment with a "½ disk"

FIG. 4 shows a fourth exemplary embodiment of the new low-inductance electrolytic capacitor wherein the conductive disk 6c is designed so that only half of it is "high", as compared to the third exemplary embodiment of FIG. 3 wherein the disk 6b is high over three-quarters of its area. Thus, only half the disk 6c here is high and half is low. An inductance that is as low as that given the exemplary embodiment of FIG. 3 is in fact not achieved with such a design. However, the contacting is less problematical for a customer since exactly half the area of the disk 6c is respectively available for the contacting.

Each conductive disk 6, 6a, 6b and 6c in the above and also in the following exemplary embodiments is composed of metal, for example aluminum. However, it is also possible to insulate the conductive disk in all of these exemplary embodiments so that it is insulated except for the contacting locations in the region of the negative lead-through 4 and at the flared flange 3, which can occur by means of an appropriate coating, gluing, lacquering or enameling.

Figure 5:
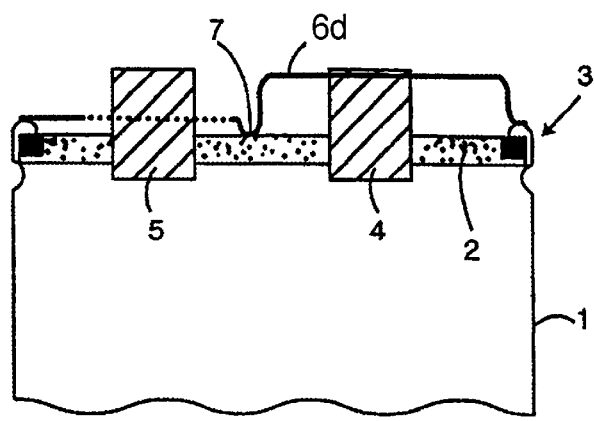
FIG. 5 is a schematic cross-sectional view of the new low-inductance electrolytic capacitor in a fifth exemplary embodiment with a disk that also carries out a stabilizing function.

FIG. 5 shows a fifth exemplary embodiment of the new low-inductance electrolytic capacitor that is designed similar to the exemplary embodiment of FIG. 4, since a "½ disk" is likewise present here. In addition to the exemplary embodiment of FIG. 4, however, the conductive disk 6d is provided with an arching 7 that forms a point of contact with the terminating disk 2. This terminating disk 2 can thus be mechanically stabilized to prevent arching, so that a thin, rubber-coated resin-bonded paper can also be potentially utilized for the terminating disk 2.

Figure 6:
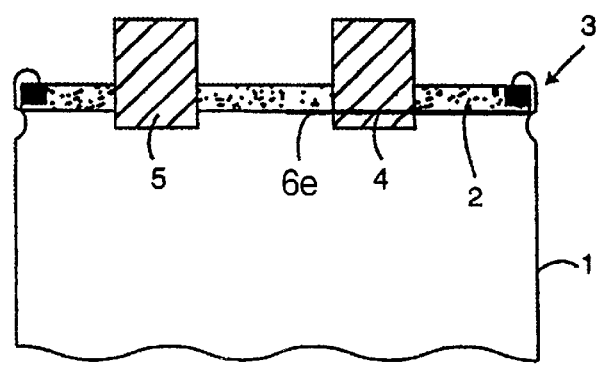
FIG. 6 is a schematic cross-sectional view of the new low-inductance electrolytic capacitor in a sixth exemplary embodiment with a disk guided in the inside of the capacitor.
Figure 7:
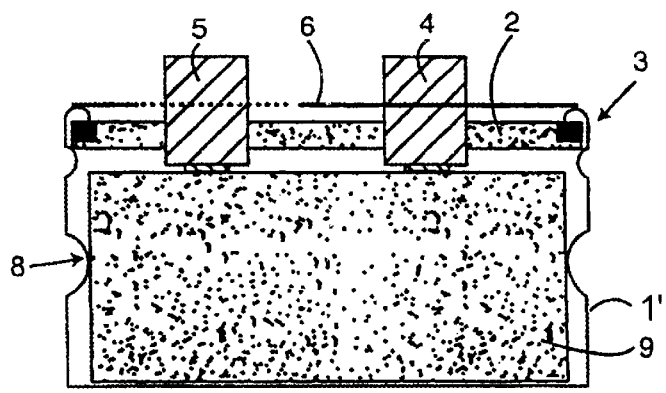
FIG. 7 is a schematic cross-sectional view of the new low-inductance electrolytic capacitor in a seventh exemplary embodiment with a middle bead.

FIG. 6 shows a sixth exemplary embodiment of the new low-inductance electrolytic capacitor wherein the conductive disk 6e is arranged in the interior of the capacitor. The inductance is not lowered as much given such a design since the current must flow completely through the negative lead-through 4. In order to avoid too great an insulating outlay, the conductive disk 6e is applied only in the region of half the terminating disk 2. What is advantageous about such a design of the conductive disk 6e is that the production sequence and the outward appearance remain unchanged. Ultimately, only a terminating disk 2 modified by the disk 6e is required FIG. 7 shows a seventh exemplary embodiment of the new low-inductance electrolytic capacitor that essentially corresponds to the exemplary embodiment of FIG. 1. Additionally, a winding 9 of the electrolytic capacitor is connected to a pot 1' by a middle bead 8 here, so that there is an additional connection between the pot 1' and the winding 9. The high-frequency currents that flow across the disk 6 can thus proceed from the winding 9 to the pot 1' with even lower inductive impedance. The overall self-inductance of the electrolytic capacitor can be lowered further with this measure.

Such a middle bead 8, of course, can be employed in all other exemplary embodiments of the new electrolytic capacitor. Instead of the middle bead 8, it is also possible to provide a corresponding impression or notch or some other design for the pot 1'.

Figure 8:
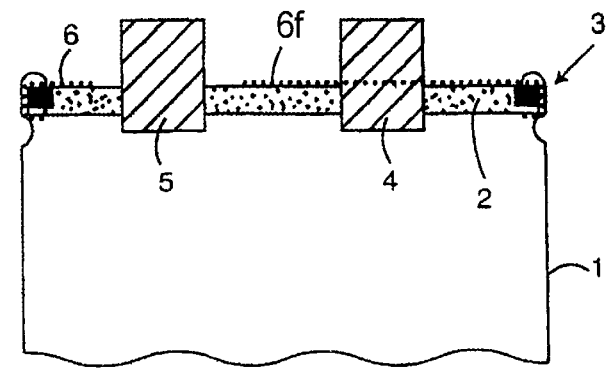
FIG. 8 is a schematic cross-sectional view of the new low-inductance electrolytic capacitor in an eighth exemplary embodiment with a disk formed by a lamination or vacuum-metallization layer.

Quite generally, the conductive disk can be composed of a lattice or wire net or, potentially, of correspondingly conducted individual wires that produce an electrical connection between the pot 1 and the negative lead-through 4. In an eighth exemplary embodiment of the new low-inductance electrolytic capacitor, FIG. 8 shows a correspondingly designed conductive disk 6f composed of a coating of metal, for example, aluminum that is vapor-deposited onto the terminating disk 2 over the edge thereof and into the inside of the electrolytic capacitor, so that the contacting to the pot 1 ensues via a pressure contact between the terminating disk 2 and the under edge of the flared flange 3.

I claim:

1. A low-inductance electrolytic capacitor comprising a pot accepting a winding and having an insulating terminating disk into which a positive lead-through and a negative lead-through to the winding are introduced, said capacitor having an electrically conductive disk at least in the region between a pot edge and a negative lead-through and being electrically separated from the positive lead-through, the electrically conductive disk being electrically conductively connected to a flared flange of the pot edge and the electrically conductive disk contacting the negative lead-through at a point adjacent one end of the negative lead-through facing away from the winding.

2. A low-inductance electrolytic capacitor according to claim 1, wherein the electrically conductive disk has at least a portion which proceeds at a height of the one end of the negative lead-through facing away from the winding.

3. A low-inductance electrolytic capacitor according to claim 2, wherein said portion is half of the electrically conductive disk.

4. A low-inductance electrolytic capacitor according to claim 2, wherein the portion is ¾ of the electrically conductive disk.

5. A low-inductance electrolytic capacitor according to claim 2, wherein the electrically conductive disk contacts the terminating disk in at least one location.

6. A low-inductance electrolytic capacitor according to claim 5, wherein the terminating disk is a rubber-coated resin-bonded paper disk.

7. A low-inductance electrolytic capacitor according to claim 1, wherein the electrically conductive disk contacts the terminating disk in at least one location.

8. A low-inductance electrolytic capacitor according to claim 7, wherein the terminating disk is a rubber-coated resin-bonded paper disk.

9. A low-inductance electrolytic capacitor according to claim 1, wherein the electrically conductive disk is provided on a side of the terminating disk facing toward the winding.

10. A low-inductance electrolytic capacitor according to claim 1, wherein the pot is connected to the winding in at least one location.

11. A low-inductance electrolytic capacitor according to claim 10, wherein the pot is connected to the winding by the pot having a mechanical connection selected from the group consisting of a bead, an impression and notches.

12. A low-inductance electrolytic capacitor according to claim 1, wherein the electrically conductive disk is composed of a material selected from the group consisting of metal lattice, a wire net and individual wires.

13. A low-inductance electrolytic capacitor according to claim 1, wherein the electrically conductive disk is a coating on the terminating disk.

14. A low-inductance electrolytic capacitor according to claim 13, wherein the coating extends into the pot.

15. A low-inductance electrolytic capacitor according to claim 13, wherein the coating is composed of aluminum.

16. A low-inductance electrolytic capacitor according to claim 1, wherein the electrically conductive disk is provided in all locations except the contacting locations with an insulating material selected from a group consisting of glue, lacquer, and enamel.

* * * * *